(12) United States Patent
Hearn et al.

(10) Patent No.: US 6,246,662 B1
(45) Date of Patent: Jun. 12, 2001

(54) VIBRATION DAMPING SYSTEM AND SERVOWRITER

(75) Inventors: Anthony R. Hearn, South Wonston; Colin Presly, Havant; Graham Collins, Hambledon, all of (GB)

(73) Assignee: Havant International Limited, Hampshire (GB)

( * ) Notice: Subject to any disclaimer, the term of this patent is extended or adjusted under 35 U.S.C. 154(b) by 0 days.

(21) Appl. No.: 09/165,303

(22) Filed: Oct. 2, 1998

(30) Foreign Application Priority Data

Oct. 10, 1997 (GB) .................................................. 9721694

(51) Int. Cl.[7] .................................................. G11B 33/08
(52) U.S. Cl. .................................................. 369/247
(58) Field of Search .................................. 369/247, 244, 369/176; 360/77.01, 77.05, 77.07, 73.08, 77.09, 78.14

(56) References Cited

U.S. PATENT DOCUMENTS

| 4,722,505 | 2/1988 | Kaiser | 248/561 |
|---|---|---|---|
| 4,932,019 | * 6/1990 | Bessho | 369/247 |
| 5,379,990 | * 1/1995 | Ando et al. | 369/248 |
| 5,659,436 | * 8/1997 | Yarmchuk et al. | 360/75 |
| 5,668,679 | * 9/1997 | Swearingen et al. | 360/75 |
| 5,875,064 | * 2/1999 | Chainer et al. | 360/75 |
| 5,988,513 | * 11/1999 | Dean et al. | 235/494 |

FOREIGN PATENT DOCUMENTS 1 332 669   10/1973   (GB) .
1 354 105    5/1974   (GB) .

* cited by examiner

*Primary Examiner*—David L. Ometz
*Assistant Examiner*—Franklin D. Altman, III
(74) *Attorney, Agent, or Firm*—Pillsbury Winthrop LLP

(57) ABSTRACT

A vibration damping system is provided for damping vibrations in an apparatus (1). The damping system is particularly useful in a servowriter (1). The damping system has resilient means (7) for supporting at least the majority of the weight of the apparatus (1). The resilient means (7) has a first spring rate. The damping system has damping means (8) for damping vibrations of the apparatus (1). The damping means (8) has an effective second spring rate. The ratio of the first spring rate to the effective second spring rate is r:1 where r<1.

14 Claims, 2 Drawing Sheets

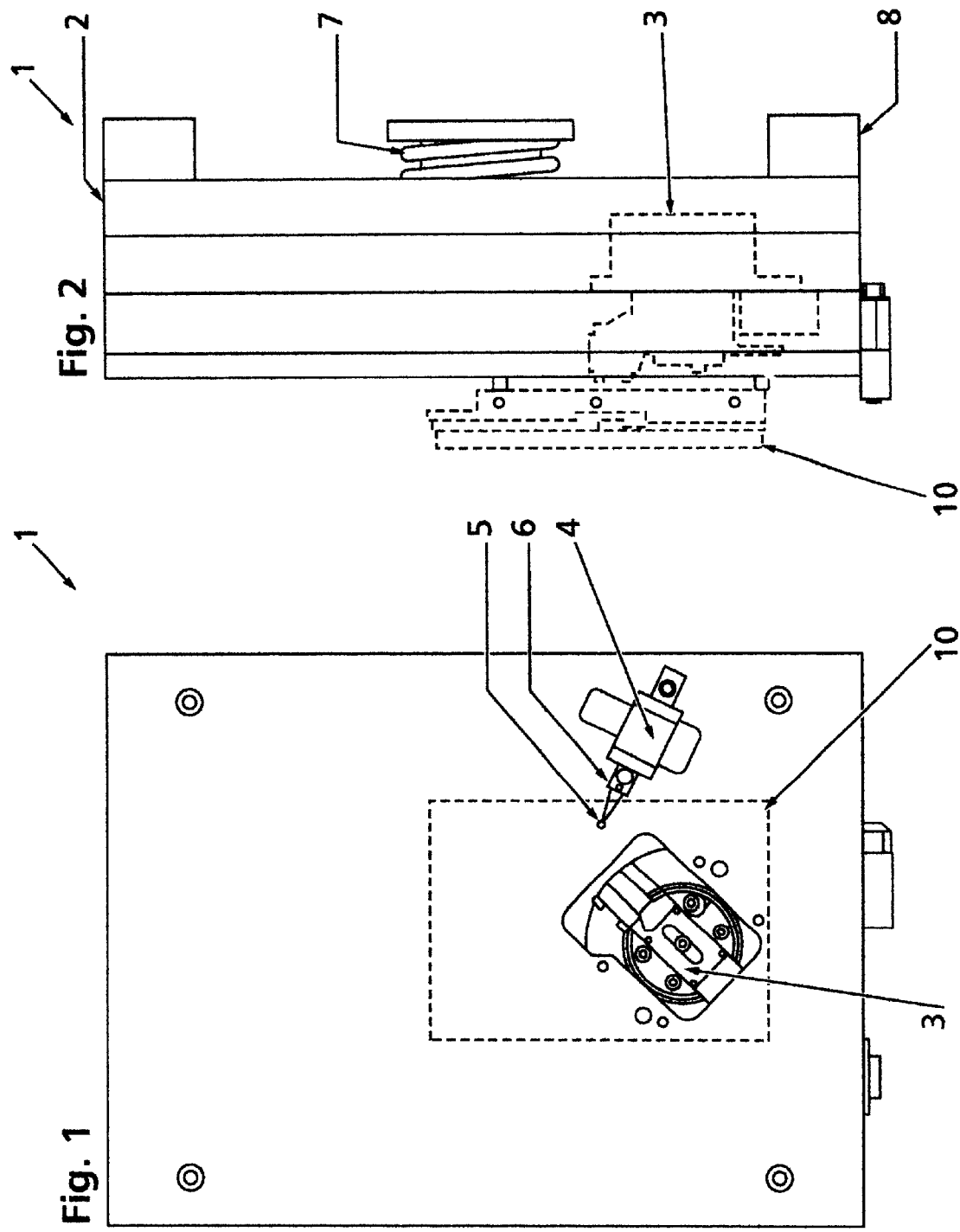

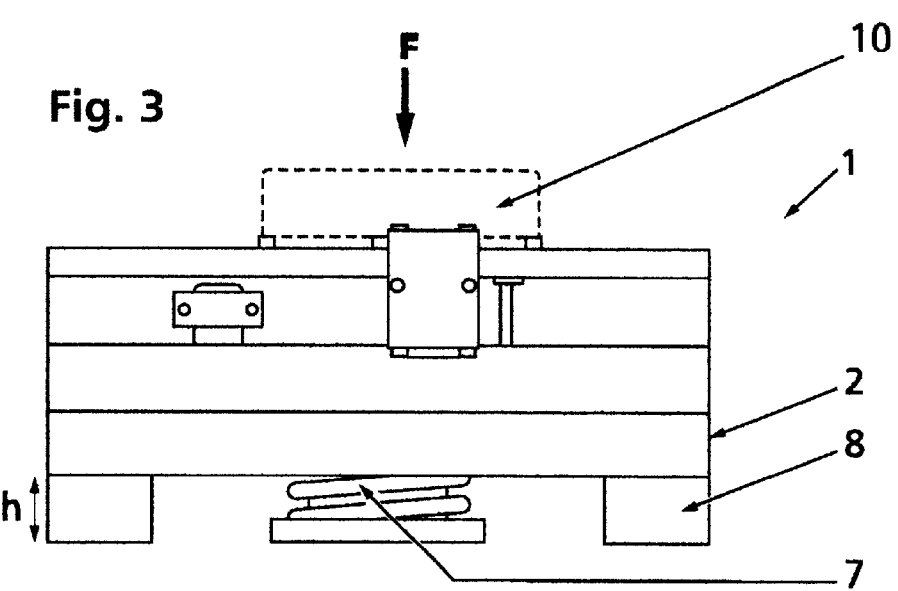
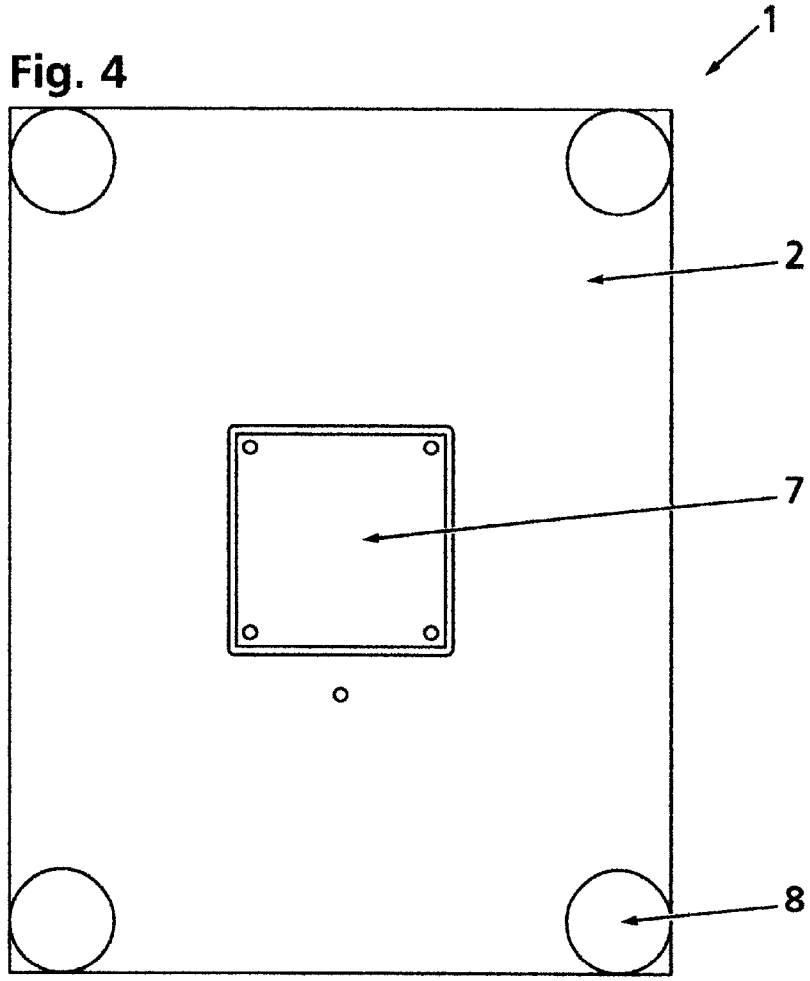

VIBRATION DAMPING SYSTEM AND SERVOWRITER

The present invention relates to a vibration damping system and to a servowriter.

Many types of apparatus need to be isolated from vibrations which would otherwise be transmitted to the apparatus from a substrate such as a stand, shelf or other fixture on which the apparatus is mounted.

In particular, information for systems such as data processing systems is typically stored on storage media. Particular use is made of storage disks such as magnetic disks, opto-magnetic disks, and the like. In manufacturing storage media such as hard disk drives, a head disk assembly consisting of the disk or disks, the read/write head(s), the motor and arm electronics, is mounted in a mastering station known as a servowriter. The servowriter writes a pattern of magnetic information (the "servo track pattern") onto the disk. The servo track pattern becomes the master reference which is used by the disk drive during normal operation in order to locate the tracks and sectors on the disk for data storage and retrieval.

The time taken to write the servo tracks is increasing each year, for several reasons. In particular, the number of tracks per inch on the disk is increasing annually, owing to improved manufacturing techniques and improved control of the read/write head or heads. Furthermore, head disk assemblies are being manufactured and assembled more quickly each year so that the rate at which the assembled head disk assemblies come off the production line ready for servo track writing is increasing each year. Because the servowriting process is normally carried out in a clean room, and clean room space is expensive, there is generally a desire to reduce the size of the servowriters so that more servowriters can be fitted in a particular clean room space.

Traditionally, servowriters have used a linear positioning system to position the product head (i.e. the read/write head of the head disk assembly) in the head disk assembly during the servowriting process. This meant that a large stable base was required to support the servowriter. The servowriter base in such cases was typically granite. However, it was still necessary to isolate the servowriter from external vibrations. Thus, a low frequency active damping system was applied to the base, which was inevitably expensive. Preferably, therefore, a low cost passive damping system should be used.

Modern servowriters use rotary positioning systems to position the product arm, the rotary positioning system typically being mounted within the footprint of the head disk assembly when mounted on the servowriter. Because a rotary positioning system is used to position the product arm, and a balanced product head arm is used, the sensitivity of the servowriter to translational movement such as base distortion and creep is much reduced compared to a linear positioning system. However, because of the increase in the track density, the need for good isolation against vibration is even greater than previously. It would be possible to provide an active vibration damping system, but the cost of an active system is significant. Accordingly, it is desirable to provide a low cost passive vibration damping system which can provide damping of vibrations in a rotary direction generally or substantially in the plane of the servowriter.

According to a first aspect of the present invention, there is provided a vibration damping system for damping vibrations in an apparatus, the damping system comprising: resilient means for supporting at least the majority of the weight of the apparatus, the resilient means having a first spring rate; and, damping means for damping vibrations of the apparatus, the damping means having an effective second spring rate; the ratio of the first spring rate to the effective second spring rate being r:1 where r<1.

The resilient means carries at least the majority, and preferably substantially the whole, of the weight of the apparatus. This means that in the preferred embodiment the apparatus is "floating" on the resilient means. This in turn allows inexpensive damping means (such as rubber mounts) to be used to damp vibrations arising in the apparatus as the damping means is not subjected to any substantial load. The use of resilient means having a relatively low spring rate compared to the effective spring rate of the damping means ensures that the damping effect of the damping means is not diluted by the resilient means, the resilient means therefore contributing relatively little to the overall damping effect provided by the damping system as a whole.

The damping means is preferably arranged to passively damp rotary vibrations of the apparatus.

The resilient means is preferably mounted to support the apparatus at the centre of mass of the apparatus.

The damping means is preferably mounted to be radially outwards of the centre of mass of the apparatus. In other words, the damping means is preferably mounted so as not to be at the centre of mass of the apparatus.

It is most preferred that the damping means be mounted at or towards the periphery of the apparatus.

Preferably, r is in the range 0.5 to 0.1.

The damping means preferably comprises plural damping mounts.

The resilient means may be a compression spring. The compression spring may be a coil spring.

The damping means may be rubber. Any other suitable material may be used.

In one specific application of the system, the apparatus is a servowriter base.

The servowriter base may be integral with a servowriter. Alternatively, a servowriter may be mounted on the base.

The servowriter may have a rotary positioning system for rotary positioning of a product arm of a head disk assembly mounted on the servowriter.

According to a second aspect of the present invention, there is provided a servowriter, the servowriter comprising: a rotary positioning system for rotary positioning of a product arm of a head disk assembly mounted on the servowriter; a compression spring mounted at or substantially at the centre of mass of the servowriter for supporting at least the majority of the weight of the servowriter base, the compression spring having a first spring rate; and, plural vibration damping mounts at or towards the periphery of the servowriter for passively damping rotary vibrations of the servowriter, the vibration damping mounts having an effective second spring rate; the ratio of the first spring rate to the effective second spring rate being in the range r:1 where r<1.

An embodiment of the present invention will now be described by way of example with reference to the accompanying drawings, in which:

FIG. 1 is a plan view from above of an example of a servowriter having a damping system according to the present invention;

FIG. 2 is a side elevation of the servowriter of FIG. 1;

FIG. 3 is an end elevation of the servowriter of FIG. 1; and,

FIG. 4 is a plan view from below of the servowriter of FIG. 1.

Referring to the drawings, a servowriter 1 has a steel base 2 which, because of its relatively high density, provides a degree of stability and vibration damping for the servowriter 1.

The servowriter 1 has a rotary positioning system 3 which is known in itself and which will not be described in detail herein. The rotary positioning system is shown in dashed lines in FIG. 2. The servowriter 1 also has a clock head load mechanism 4 which controls movement of a clock head 5 which is carried on a clock head arm 6. Again, the clock head load mechanism 4 and clock head 5 are known in themselves and will not be described in detail herein.

Use of the servowriter 1 in itself is well known and will only be briefly described. A head disk assembly 10 (shown in dashed lines in the drawings) is clamped to the servowriter 1 with a clamping force F. The clock head load mechanism 4 moves the clock head 5 over the magnetic disk of the head disk assembly 10 to write a clock track onto the disk. The clock track is used as a timing reference during writing of the servo pattern onto the disk. The servo pattern itself is written using a read/write head of the head disk assembly 10. That read/write head is controllably moved using the rotary positioning system 3.

Because the read/write head of the head disk assembly 10 is balanced and, furthermore, because a rotary positioning system 3 is used to move the read/write head of the head disk assembly 10, the sensitivity of the servowriter 1 as a whole to translational or Cartesian movement (i.e. horizontal X-Y movement in or parallel to the plane of the servowriter base 2 and Z movement vertically up and down) is relatively small. However, because a rotary positioning system 3 is used, vibration in a rotary direction in or parallel to the plane of the servowriter base 2 is more of a problem and must be controlled.

Active damping systems could be used, but these are relatively expensive. Accordingly, the present invention makes use of a passive damping material. Many damping materials, such as rubber, have a modulus of elasticity which increases under compressive loading of the material. The effective damping capability of the material thus reduces under load and the resonant frequency of a servowriter mount using only rubber would rise undesirably (see further below). A large amount of the damping material such as rubber could be used in order to lower the mount resonant frequency, but the material used would be bulky and expensive. The present invention therefore makes use of means for supporting at least the majority of the weight of the servowriter 1 and separate damping means for damping vibrations of the base.

In particular, one end of a coil compression spring 7 is fixed to the underneath of the base 2 of the servowriter 1 so that the other end of the compression spring 7 contacts the substrate (not shown) on which the servowriter 1 is mounted. The coil compression spring 7 supports at least the majority of the weight of the servowriter 1 and preferably supports substantially the whole of the weight of the servowriter 1. This effectively allows the servowriter 1 to "float" on the compression spring 7.

Four rubber vibration damping mounts 8 are fixed to the underside of the servowriter base 2. In the preferred embodiment, the rubber vibration damping mounts 8 are mounted at the corners of the servowriter base 2. The height h of the damping mounts 8 is such that the damping mounts 8 contact the substrate on which the servowriter 1 is mounted but without any significant proportion of the weight of the servowriter 1 being carried by the damping mounts 8. This means that the damping mounts 8 do not carry any significant load and are therefore not compressed to any significant degree and, accordingly, can provide excellent and predictable vibration damping without that damping effect being diluted (at least to any significant degree) by any vibration damping provided by the spring 7. In a particular example, the ratio of the weight carried by the compression spring 7 to the total weight carried by the four damping mounts 8 is approximately 8:1.

Because the damping mounts 8 are mounted radially away from the centre of mass of the servowriter 1, the damping of rotary vibrations is dominated by the effect of the damping mounts 8, especially where the damping mounts 8 are mounted as close to the periphery of the servowriter 1 as possible as in the specific example shown in the drawings.

Rubber, whether natural or synthetic or a blend of natural and synthetic rubbers, is a good material for the damping mounts 8. A particularly suitable material is that known by the trade mark Sorbothane. However, any suitable material can be used for the damping mounts 8, the main requirement being that the material undergoes hysteresis during compression and expansion so as to enable vibrations of the servowriter 1 to be damped by the material. As the servowriter 1 is usually mounted in a clean room, the temperature of which is controlled to be constant, heat which will build up in the damping mounts 8 in use due to vibration will be removed from the damping mounts 8 such that their temperature, and accordingly their performance, will be substantially constant, repeatable and predictable.

Where the ratio of the spring rate of the compression spring 7 to the effective spring rate of the damping mounts 8 is r:1, the effective damping provided by the combination of the compression spring 7 and the damping mounts 8 is approximately equal to the damping provided by the damping mounts divided by (r+1), i.e.

$$\text{Damping}_{combination} = \text{Damping}_{mounts}/(r+1)$$

Generally, therefore, r should be small in order for the damping effect of the damping mounts 8 to dominate.

A characteristic of a servo system is the open loop crossover (also known as the servo bandwidth) of the servo system which is the frequency at which the total gain G of the servo system equals −1. The frequency of the means which isolates the servowriter 1 from the substrate on which it is mounted should preferably be lower than 1% of the servo bandwidth. Typically, the bandwidth might be 700 Hz and thus the resonant frequency of the means which supports the servowriter 1 should be about 7 Hz or less.

In a specific example of the present invention, a stainless steel spring 7 having a free length of 110mm was used, the spring rate being 6.06 N/mm. The height h of the Sorbothane damping mounts 8 was 30 mm. The total weight of the servowriter 1 was 46 kg. This weight was distributed such that the spring 7 carried approximately 41 kg and the four damping mounts 8 carried 1.25 kg each. In this example, the resonant frequency of the total mounting system for the servowriter 1 comprising the compression spring 7 and damping mounts 8 was 4.3 Hz. The effective spring rate of the damping mounts 8 under normal loaded conditions in this example was approximately 27.54 N/mm. The ratio of the spring rate of the spring 7 to the effective spring rate of the damping mounts 8 was 0.22:1.

An embodiment of the present invention has been described with particular reference to the example illustrated. However, it will be appreciated that variations and modifications may be made to the example described within the scope of the present invention. It will be appreciated that the present invention has broad applicability to any apparatus requiring damping of vibrations and particularly vibrations in a rotary sense and has particular application to apparatus requiring good isolation in order to allow precise measurement or location to be carried out by the apparatus.

What is claimed is:

1. A vibration damping system for damping vibrations in an apparatus, the damping system comprising:

a resilient device mounted to support the apparatus under the center of mass of said apparatus and constructed and arranged to support at least the majority of the weight of the apparatus, the resilient device having a first spring rate; and, at least one damper for damping vibrations of the apparatus, the at least one damper having an effective second spring rate, the at least one damper not being in contact with the resilient device;

the ratio of the first spring rate to the effective second spring rate being r:1 where r<1.

2. A damping system according to claim 1, wherein the at least one damper is arranged to passively damp rotary vibrations of said apparatus.

3. A damping system according to claim 1, wherein the at least one damper is mounted to be radially outwards of the centre of mass of the apparatus.

4. A damping system according to claim 1, wherein the at least one damper is mounted at or towards the periphery of the apparatus.

5. A damping system according to any of claims 1 to 4, wherein r is in the range 0.5 to 0.1.

6. A damping system according to claim 1, wherein the at least one damper comprises plural damping mounts.

7. A damping system according to claim 1, wherein the resilient device is a compression spring.

8. A damping system according to claim 7, wherein the compression spring is a coil spring.

9. A damping system according to claim 1, wherein the at least one damper is rubber.

10. A damping system according to any of claims 1 to 9, wherein the apparatus is a servowriter base.

11. A damping system according to claim 10, wherein the servowriter base is integral with a servowriter.

12. A damping system according to claim 10, further comprising a servowriter mounted on the servowriter base.

13. A damping system according to claim 11 or claim 12, wherein the servowriter has a rotary positioning system for rotary positioning of a product arm of a head disk assembly mounted on the servowriter.

14. A servowriter, the servowriter comprising:

a rotary positioning system for rotary positioning of a product arm of a head disk assembly mounted on the servowriter;

a compression spring mounted at or substantially at the centre of mass of the servowriter for supporting at least the majority of the weight of the servowriter base, the compression spring having a first spring rate; and, plural vibration damping mounts at or towards the periphery of the servowriter for passively damping rotary vibrations of the servowriter, the vibration damping mounts having an effective second spring rate;

the ratio of the first spring rate to the effective second spring rate being in the range r:1 where r<1.

* * * * *